United States Patent [19]

Yeakley

[11] Patent Number: 5,149,222

[45] Date of Patent: Sep. 22, 1992

[54] ROLLING FLEXURE BEARING SYSTEM FOR CONSTRAINING MOVEMENT OF A CARRIAGE AND METHOD THEREFORE

[75] Inventor: Lester M. Yeakley, Boulder, Colo.

[73] Assignee: Storage Technology Corporation, Louisville, Colo.

[21] Appl. No.: 771,652

[22] Filed: Oct. 4, 1991

[51] Int. Cl.$^5$ .............................................. F16D 1/00
[52] U.S. Cl. ...................................... 403/291; 403/121; 403/203
[58] Field of Search ................... 403/203, 291, 121; 248/628, 629, 604, 626, 630; 267/160

[56] References Cited

U.S. PATENT DOCUMENTS 3,417,984  12/1968  Sindlinger ........................ 267/160
4,607,492   8/1986  Demus et al. .................... 248/626

Primary Examiner—Andrew V. Kundrat
Attorney, Agent, or Firm—Dorr, Carson, Sloan & Peterson

[57] ABSTRACT

A rolling flexure bearing. The bearing is formed of a thin sheet of elastic material that is attached to a surface of a first object. The sheet extends a short distance along the surface of the first object. The sheet then makes a 180 degree elastic bend off the surface of the first object to reverse the direction of the sheet. After making the bend, the sheet then extends a short distance along the surface of the second object substantially parallel to the surface of the first object. The sheet is attached at its end to the surface of the second object.

In this configuration, the flexure bearing is stiff along an axis parallel to the bend axis to constrain movement along this axis. The flexure bearing, along the axis normal to the surfaces of the objects, has a high compliance rate to provide damping between the objects. Along the third orthogonal axis, normal to the bend axis, the bearing allows free relative movement between the two objects, until it approaches either of the two attachment areas.

7 Claims, 2 Drawing Sheets

ROLLING FLEXURE BEARING SYSTEM FOR CONSTRAINING MOVEMENT OF A CARRIAGE AND METHOD THEREFORE

BACKGROUND OF THE INVENTION

1. Field of the Invention

The present invention relates to the field of bearings, particularly high performance bearings for planar movement of low mass objects.

2. Statement of the Problem

It is often necessary to provide bearings between two surfaces undergoing relative movement to reduce friction and provide support and guidance between these surfaces. Typically, these bearings consist of ball or roller bearings. However, in high precision applications, problems associated with the use of ball or roller bearings may arise. For example, actuator mechanisms in high performance disk drive systems frequently use ball bearings to provide stiff, low friction, precision guidance for the actuator. Problems existing with this application of ball bearings include friction, high mass, low damping capability, wear, particulate contamination and alignment.

Although the friction of ball bearings is low, it is not negligible in high performance drives. This friction affects the performance characteristics of the drive. The mass of the ball bearings form a significant part of the moving mass in a high performance disk drive. The high mass and stiffness of the ball bearings also create a lack of damping in the ball bearings, thus increasing the susceptibility of the drive to vibration.

The ball bearings also form a highly stressed point contact with the rails or support structure, causing wear and particulate contamination at the point of rolling contact. This affects the accuracy of the drive. The bearing grease used to lubricate the balls tends to dry out as well, leaving a residue which causes detenting of the bearing.

Another problem with the use of ball bearings is that the ball bearings must be critically aligned, which is difficult to achieve as well as difficult to maintain. The ball bearings can produce non-repeatable offtrack of the Read/Write heads mounted on the actuators due to ball drop within the bearing and to outer race runout.

Thus, a need exists for a bearing having a low mass, low contact stress, low friction, as well as not requiring alignment or lubrication, and not susceptible to vibration and to wear or particulate contamination.

The Solution to the Problem

The present invention provides a solution to these and other problems by providing a low mass bearing allowing free movement along a first axis, constraining movement along a second axis perpendicular to the first axis and compliant along a third axis.

The present invention provides a bearing having low friction and low mass.

The present invention provides a bearing having low stress contact with the surfaces.

The present invention provides a bearing not requiring lubrication.

The present invention provides a bearing not requiring critical alignment during installation or during operation.

The present invention provides a bearing not susceptible to wear or particulate contamination due to high stress contact.

The present invention provides a bearing having a high damping capability.

These and other solutions are provided by the present invention as will be shown in the following description in conjunction with the drawings.

SUMMARY OF THE INVENTION

The present invention provides a rolling flexure bearing for supporting and guiding two objects undergoing motion relative to one another. The bearing is formed of a thin sheet of elastic material that has a first end attached to a surface of a first object. The sheet initially extends a short distance along the surface of the first object. The sheet then makes a 180 degree elastic bend about an axis perpendicular to the direction of relative movement of the objects. This reverses the direction of the sheet. After making the bend, the sheet extends a short distance along the surface of the second object substantially parallel to the surface of the first object. The sheet is attached at its second end to the surface of the second object.

In this configuration, the flexure bearing is stiff along an axis parallel to the bend axis to constrain movement along this axis. Damping is also produced in this direction due to friction between the flat sections of the sheet and the two surfaces of the objects. The stiffness of a ball bearing may be approximated by selecting appropriate design parameters. The flexure bearing, along the axis normal to the surfaces of the objects, has a high compliance rate between the objects. Along the third orthogonal axis, normal to the bend axis and parallel to the surfaces of the objects, the bearing allows free relative movement between the two objects until it approaches either of the two attachment areas.

The flexure bearing forms a line contact at each end of the bend areas. The contact stress thus generated is due to the flexure's compliant bend and is orthogonal to the bearing's stiff direction. The bearing load is taken primarily by the attached ends of the sheet. This contact stress is very low. This greatly reduces the contact stress between the objects and the flexure bearing as compared to the point contact between the objects and a ball bearing. The line contact also enables the flexure bearing to be less susceptible to distortion due to movement over irregularities in the surface and particle contamination. Also, since the contact stress is very low and spread over a line, there is less wear on the bearing and on the surfaces it moves over.

The flexure bearing has a low mass as compared with ball bearings. The rolling action of the flexure bearing occurs primarily at the bend axis, so there is little friction involved.

These and other features will become evident from the following description of the preferred embodiment taken in conjunction with the drawings.

DETAILED DESCRIPTION OF A PREFERRED EMBODIMENT

Figure 1:
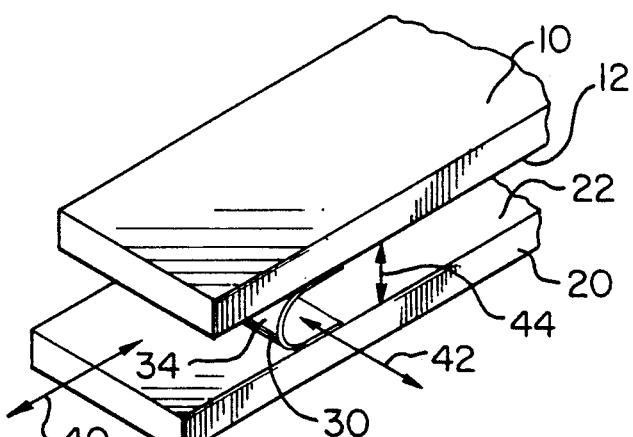
FIG. 1 shows a perspective view of a preferred embodiment of the present invention.

The present invention provides a low mass, low friction bearing guiding and supporting with respect to each other, two objects undergoing relative movement. A preferred embodiment of the present invention is illustrated in FIG. 1. Rolling flexure bearing 30 is mounted between carriage 10 and support 20. Carriage 10 is adapted for movement relative to support 20 along axis 40. Bearing 30 is a thin rectangularly-shaped sheet formed from an elastic material. A more detailed description of the material and dimensions is set forth below.

Figure 2:
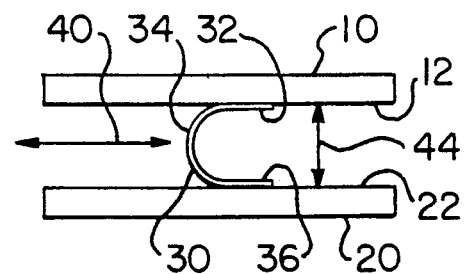
FIG. 2 shows a side view of FIG. 1.

Bearing 30 is attached along a first end portion 32 of surface 34 of the sheet to the lower surface 12 of upper carriage 10 as shown in FIGS. 1 and 2. Second end portion 36 of surface 34 is attached to upper surface 22 of support 20. The attachment between bearing 30 and carriage 10 and support 20 occurs over an area to disperse the stress from the load between bearing 30 and carriage 10 and support 20. In prior art devices, a ball bearing concentrates the bearing stress on a rolling point contact with the bearing race or with the rail and support structure. The attachment over an area reduces the stress and transfers the load at fixed areas which eliminates the wear in these areas. The effect of particles on the surfaces does not affect the accuracy of the bearing due to the tangency of the bearing to the surface as is discussed in further detail below. The attachment can be by mechanical means, such as screws (not shown), by adhesive bonding or by any well known attachment methods.

As shown in FIG. 1, bearing 30 is bent about an axis 42 parallel to both surfaces 12, 22 and normal to axis 40. This forms bearing 30 into a substantially "C" shape between carriage 10 and support 20 as illustrated in FIG. 2. The use of a thin elastic material allows the bearing to "roll" along axis 40 parallel to the surfaces 12, 22 and normal to bend axis 42. The "rolling" movement results in the displacement of the curvature of the sheet about the bend axis 42. This allows the carriage 10 and support 20 to move relative to one another along axis 40 until the curvature of the sheet approaches the attached surface end portions. Carriage 10 and support 20 are limited in relative movement by the length of bearing 30.

Bearing 30 is constrained from movement along axis 42 by the shear stress across the width of the sheet. This shear stress creates a very stiff resistance along axis 42. The flexure bearing stiffness along this axis can be designed to approach the stiffness of a ball bearing by adjusting the thickness, width and material choice of the bearing.

Figure 4:
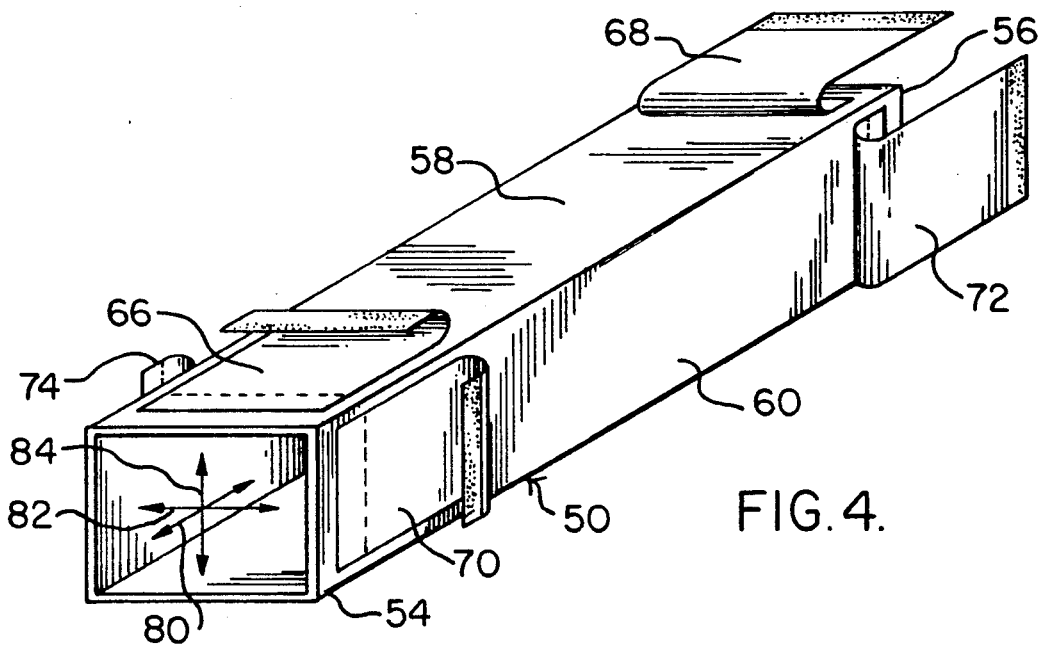
FIG. 4 shows a plurality of flexure bearings mounted on a carriage to allow movement only along one axis.

Bearing 30 is highly compliant along axis 44 normal to the surfaces 12, 22 of carriage 10 and support 20. The compliance rate provides a measure of immunity to surface roughness and surface contamination between the rolling flexure and the carriages. This compliance also produces low stress at the area of rolling contact and thus very low wear. This high compliance rate requires an additional force to maintain the bend in bearing 30. The additional force can be supplied, for example, by air bearings (not shown) acting against the surfaces 12, 14, 22 of the carriage 10 or by arranging multiple bearings on various surfaces of a moving carriage as shown in FIG. 4, discussed in more detail below.

It is to be expressly understood that the above description of a preferred embodiment is for explanatory purposes only and is not meant to limit the claimed invention. Other modifications and variations are considered to be within the inventive concept. For instance, the bearing can be formed in other shapes rather than rectangular.

The compliance of the bearing is modeled as the resultant of two spring arranged in series. One spring represents the shear stress of the flat sections of the flexure of the bearing near the attached surface portions. This spring is represented by a spring rate $k_s$ where $$k_s = \frac{Gtb}{1}$$

and

G = shear modulus of the material
t = the thickness of the bearing
b = the width of the bearing
l = the length of the bearing The second spring represents the bend section and is represented by spring rate $k_b$ where $$k_b = \frac{C_1 E t^3 b^3}{(1 - v^2) h_0^5}$$

and $C_1$ = constant
E = modulus of elasticity of the material
v = Poisson's ratio
$h_o$ = height of the flexure bearing The resultant spring rate $k_r$ is the stiffness of the bearing along axis 42 is $$k_x = \frac{k_b k_s}{k_b + k_s}$$

Figure 3:
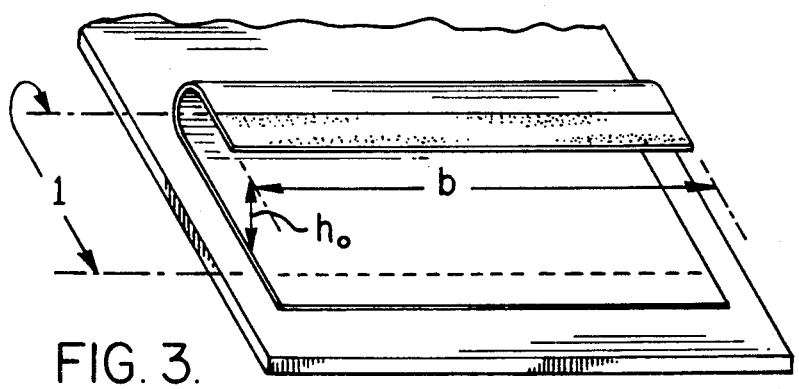
FIG. 3 shows an example of the present invention.

An example of the design parameters considered in the design of a rolling flexure bearing as shown in FIG. 3 is as follows. A thin sheet of titanium alloy 5AL-2.5SN is used, having a Young's Modulus (E) of 16,000,000 pounds per square inch, a shear modulus (G) of 6,000,000 pounds per square inch, Poisson's ratio (v) of 0.28 and a Constant ($C_1$) of 0.711.

In the example of FIG. 3, the bearing has the following dimensions: 2 inch width (b), 1.4 inch length (l), 0.001 inch thickness (t), and a height (h) of 0.086 inches. Using the above formulas, $k_b$ = 21,000 pounds per inch, $k_s$ = 8,570 pounds per inch and $k_r$ = 6,086 pound per inch. The stiffness of the bearing shown in FIG. 3 is 6,086 pounds per inch. The material choice and dimensions can be varied to obtain differing stiffness rates.

An example of the use of the present invention to control the movement of a carriage along only one axis is illustrated in FIG. 4. A thin walled, rectangular carriage 50 is supported for movement along axis 80. The surrounding support structure is not shown. Bearing 66 is mounted near the front end 54 of carriage 50 on upper surface 58 to constrain movement of carriage 50 along horizontal axis 82 while allowing carriage 50 to freely move along axis 80. Bearing 68 is mounted near rear end 56 of carriage 50 on surface 58. Bearing 68 along with bearing 66 constrains carriage 50 from yaw motion (angular motion about vertical axis 84). Bearing 70 is mounted near front end 54 on surface 60 to constrain carriage 50 from movement along vertical axis 84. Bearing 72 is mounted near rear end 56 on surface 60. Bearing 72 along with bearing 70 constrains carriage 50 from pitch motion (angular motion about axis 82). Bearing 74 is mounted near front end 54 on surface 62 (not shown). Bearing 74, along with bearing 70, constrains carriage 50 from roll motion (angular motion about axis 80). The opposing ends of bearings 66, 68, 70, 72, 74 are attached to a non-moving support structure (not shown).

The use of these five bearings supports carriage 50 in five of the six degrees of freedom while allowing carriage 50 to freely move along axis 80. More bearings may be used on a movable carriage in order to preserve symmetry and at the same time increase the stiffness of the carriage support. For instance, carriage 50 could have eight bearings (not shown) attached to it, four near front end 54 and four near rear end 56. A triangular carriage might require six bearings, having a bearing attached on each surface near each end. The number of bearings used is a function of the mass and shape of the carriage.

Figure 5:
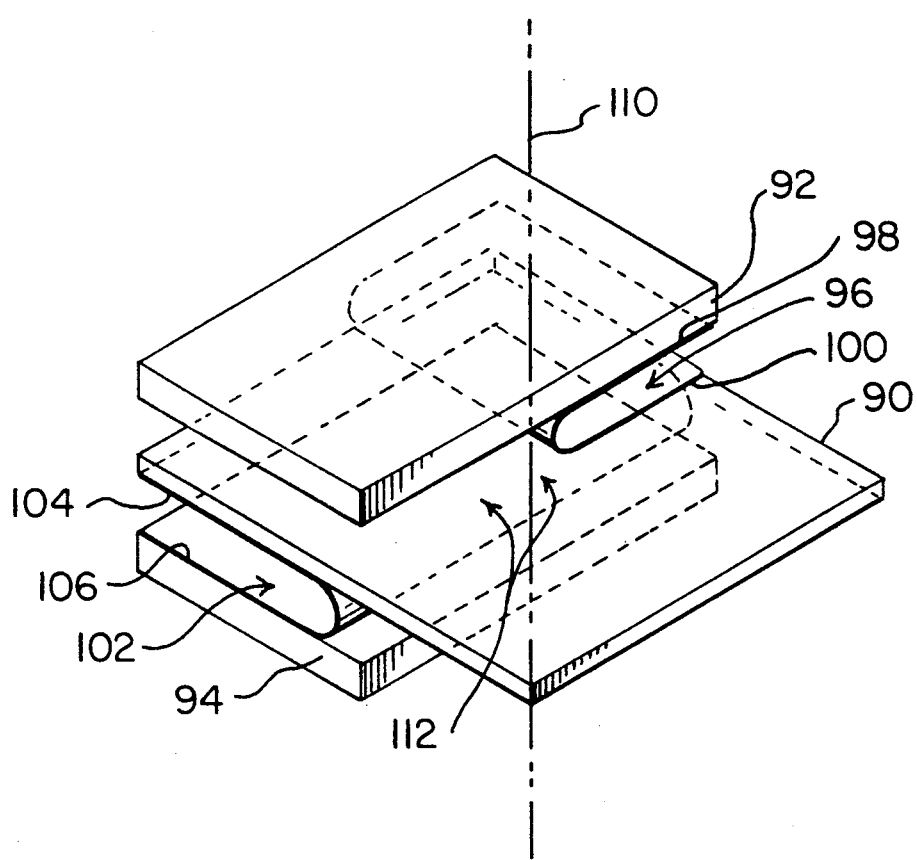
FIG. 5 shows an object mounted by flexure bearings to pivot relative to two other objects.

An alternative embodiment is illustrated in FIG. 5. A first object 90 is secured by flexure bearing 96 to second object 92 and by flexure bearing 102 to object 94. Flexure bearing 96 has a first end of one surface of the bearing attached to the lower surface 98 of object 92 and a second end of the same surface of the bearing attached to upper surface 100 of object 90. Flexure bearing 102 has a first end of one surface of the bearing attached to the lower surface 104 of object 90 and a second end of the same surface attached to the upper surface 106 of object 94. Bearing 96 and bearing 102 are arranged at an angular orientation to one another. This provides pivoting movement of object 90 relative to objects 92, 94 about axis 110, as indicated by arrow 112. The angular orientation of the two bearings relative to one another prevents linear motion of object 90 while allowing it to freely pivot. Pivot axis 110 is determined by the bent shape of the bearing and geometric formulations of the mounting of the bearings and objects. Thus, flexure bearings 96, 102 provide pivotal mounting of a member between two surfaces.

The bearing of the present invention provides a low mass, low friction support for an object undergoing movement relative to another object. This bearing has particular use in support for a low mass, planar object. The rolling flexure bearing can be designed to approach the stiffness of a roller bearing along the axis parallel to the bend axis of the flexure and normal to the direction of movement while providing compliance along the axis normal to the bend axis of the flexure bearing.

This bearing is mounted to the surfaces of the objects in such a manner so as to minimize the contact stress between the bearing and the surfaces. This provides at least two benefits. The surfaces and the bearings have little wear and runout due to the minimal stress from the line contact and the low mass involved. Also, the bearing is not susceptible to distortion due to surface roughness or contamination on the surface or bearing. The compliance of the flexure normal to the surfaces allows the bearing to move over any surface roughness or contamination without affecting the precision of the support.

The bearing of the present invention does not require lubrication. This improves the precision of the movement as well as eliminating any problems due to the lubrication drying out or becoming contaminated.

These and other benefits are provided by the present invention. The present invention is not meant to be limited by the above description of a preferred embodiment. It is to be expressly understood that the claimed invention encompasses other modifications and alterations within the scope and spirit of the inventive concept.

I claim:

1. A method for forming rolling flexure bearings positioned between a rectangular carriage and a second object undergoing relative movement to constrain the relative movement to one degree of freedom, said method comprising the steps of:
   (a) attaching a first end portion of one surface of a thin sheet of elastic material on the proximate end of a first surface of said carriage;
   (b) bending said sheet about an axis parallel to the surfaces of said carriage and said object and normal to the direction of relative movement; and
   (c) attaching the opposing end portion of said one surface of said sheet to a surface of the second said object to form a first flexure bearing;
   (d) repeating said steps a-c to mount a second flexure bearing on the distal end of said first surface of said carriage to be aligned with said first flexure bearing;
   (e) repeating said steps a-c to mount a third flexure bearing on the proximate end of a second surface of said carriage;
   (f) repeating said steps a-c to mount a fourth flexure bearing on the distal end of said second surface of said carriage to be aligned with said third flexure bearing; and
   (g) repeating said steps a-c to mount a fifth flexure bearing on a third surface of said carriage.

2. The method of claim 1 wherein said step (a) of attaching said first bearing to said surface of the first object includes attaching said sheet to the first object along substantially the full width of said sheet; and
   said step of attaching said first bearing to said surface of the second object includes attaching said sheet to the second object along substantially the full width of said sheet.

3. A method for forming rolling flexure bearings positioned between an object undergoing angular movement relative to two opposing surfaces, said method comprising the steps of:
   (a) attaching a first end portion of one surface of a thin sheet of elastic material to a first surface of said object;
   (b) bending said sheet about an axis parallel to said first surface and said opposing surfaces to form a curvilinear shape; and
   (c) attaching the opposing end portion of said one surface of said sheet to one of said opposing surfaces to form a first flexure bearing;
   (d) attaching a first end portion of one surface of a second thin sheet of elastic material on a second surface of said object opposing said first surface of said object and at an angular orientation relative to said first flexure bearing;
   (e) bending said second sheet about an axis parallel to said second surface and said opposing surfaces to form a curvilinear shape; and
   (f) attaching the opposing end portion of said one surface of said second sheet to the other of said opposing surfaces so that said object is pivotally mounted relative to said opposing surfaces.

4. A system of constraining a multi-surface carriage for one degree of freedom of movement, said system comprising:

five flexure bearings; each of said five flexure bearings including:

a thin sheet of elastic material;

means for securing a first end portion of one surface of said thin sheet to a surface of the carriage;

means for securing a second end portion of said one surface of said thin sheet to a surface of another object; and a bend axis formed in said thin sheet of material perpendicular to the direction of movement of said flexure bearing so said thin sheet is formed in a curvilinear shape so that said flexure bearing is moveable in a direction normal to said bend axis but is constrained from movement in a direction parallel to said bend axis; and a first of said fire flexure bearings attached to the proximate end of a first surface of the carriage;

a second of said five flexure bearings attached to the distal end of the first surface of the carriage and aligned with said first flexure bearing;

a third of said five flexure bearings attached to the proximate end of a second surface of the carriage;

a fourth of said five flexure bearings attached to the distal end of the second surface of the carriage and aligned with said third flexure bearing;

a fifth of said five flexure bearings attached to a third surface of the carriage; and each of said five flexure bearings attached to surfaces opposing the carriage surfaces so that the carriage is constrained to linear movement with one degree of movement in a direction normal to the bend axes of each of said five flexure bearings.

5. The system of claim 4 wherein each of said five flexure bearings further comprising:

a degree of compliance along an axis perpendicular to said bend axis and said direction of constraint.

6. A system of constraining a first object to angular movement relative to two opposing surfaces, said system comprising:

at least two flexure bearings; each of said at least two flexure bearings including:

a thin sheet of elastic material;

means for securing a first end portion of one surface of said thin sheet to a surface of the carriage;

means for securing a second end portion of said one surface of said thin sheet to a surface of one of the two opposing surfaces; and a bend axis formed in said thin sheet of material perpendicular to the direction of movement of said flexure bearing so said thin sheet is formed in a curvilinear shape so that said flexure bearing is moveable in a direction normal to said bend axis but is constrained from movement in a direction parallel to said bend axis; and a first of said at least two flexure bearings attached to a first surface of the object and to one of the opposing surfaces; and a second of said at least two flexure bearings attached to a second surface of the object opposing said first surface and said second flexure being at an angular orientation to said first flexure bearing and attached to the other of the opposing surfaces so that the object is pivotally mounted between the two opposing surfaces.

7. The system of claim 6 wherein each of said at least two flexure bearings further comprise:

a degree of compliance along an axis perpendicular to both said bend axis and said direction of constraint.

* * * * *